(12) United States Patent
Hachiya

(10) Patent No.: US 10,343,627 B2
(45) Date of Patent: Jul. 9, 2019

(54) WIRE HARNESS WITH CONNECTION MEMBER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yoshikazu Hachiya, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 211 days.

(21) Appl. No.: 15/525,852

(22) PCT Filed: Nov. 13, 2015

(86) PCT No.: PCT/JP2015/081980
§ 371 (c)(1),
(2) Date: May 10, 2017

(87) PCT Pub. No.: WO2016/080306
PCT Pub. Date: May 26, 2016

(65) Prior Publication Data
US 2019/0054869 A1 Feb. 21, 2019

(30) Foreign Application Priority Data
Nov. 19, 2014 (JP) ................ 2014-234417

(51) Int. Cl.
*B60R 16/02* (2006.01)
*H01B 7/04* (2006.01)
(Continued)

(52) U.S. Cl.
CPC ...... *B60R 16/0215* (2013.01); *B60R 16/0207* (2013.01); *B60R 16/03* (2013.01);
(Continued)

(58) Field of Classification Search
None
See application file for complete search history.

(56) References Cited

U.S. PATENT DOCUMENTS 5,230,713 A * 7/1993 Schauer ............... B60R 16/027
29/856
6,163,958 A * 12/2000 Suzuki .................. H01R 43/01
29/33 M
(Continued)

FOREIGN PATENT DOCUMENTS

JP H02145711 U 12/1990
JP 2005100704 A 4/2005
(Continued)

OTHER PUBLICATIONS

International Search Report and Written Opinion for application PCT/JP2015/081980 dated Feb. 16, 2016; 6 Pages.

Primary Examiner — Dimary S Lopez Cruz
Assistant Examiner — Muhammed Azam
(74) Attorney, Agent, or Firm — Reising Ethington, P.C.

(57) ABSTRACT

A wire harness includes a plurality of bendable electric wires, a first connection member that is electrically connected to the plurality of electric wires and is a connection target that is provided at a first end of the plurality of electric wires and is shared by the plurality of electric wires, and a second connection member that is electrically connected to the plurality of electric wires and is a connection target that is provided at a second end of the plurality of electric wires and is shared by the plurality of electric wires.

3 Claims, 7 Drawing Sheets

(51) Int. Cl.
*H01B 7/06* (2006.01)
*B60R 16/03* (2006.01)
*H01R 43/28* (2006.01)

(52) U.S. Cl.
CPC ............... *H01B 7/04* (2013.01); *H01B 7/06* (2013.01); *H01R 43/28* (2013.01)

(56) References Cited

U.S. PATENT DOCUMENTS

| | | | | |
|---|---|---|---|---|
| 6,270,359 | B1* | 8/2001 | Kondo | B60R 16/0239 439/76.2 |
| 2007/0037452 | A1* | 2/2007 | Martin | H01R 13/502 439/638 |
| 2009/0174991 | A1* | 7/2009 | Mahdavi | G06F 1/189 361/679.02 |
| 2009/0305521 | A1* | 12/2009 | Yang | H01R 4/02 439/56 |
| 2011/0045697 | A1* | 2/2011 | Sawamura | B60R 16/0207 439/587 |
| 2012/0032587 | A1* | 2/2012 | Shih | F21S 4/26 315/32 |
| 2012/0103648 | A1* | 5/2012 | Ogura | H01B 7/0045 174/34 |
| 2013/0017728 | A1* | 1/2013 | Miyawaki | H01R 12/57 439/625 |
| 2013/0023158 | A1* | 1/2013 | Kato | H01R 43/24 439/625 |
| 2013/0233615 | A1* | 9/2013 | Pimentel | G02B 6/4477 174/650 |
| 2014/0076627 | A1* | 3/2014 | Maher | H02G 15/064 174/77 R |
| 2014/0353029 | A1* | 12/2014 | Tsubouchi | H01R 13/6463 174/72 A |
| 2018/0188463 | A1* | 7/2018 | Szumacher | G02B 6/448 |

FOREIGN PATENT DOCUMENTS

| | | |
|---|---|---|
| JP | 2006190495 A | 7/2006 |
| JP | 2007311106 A | 11/2007 |
| JP | 2013069509 A | 4/2013 |

* cited by examiner

*Figure 8*
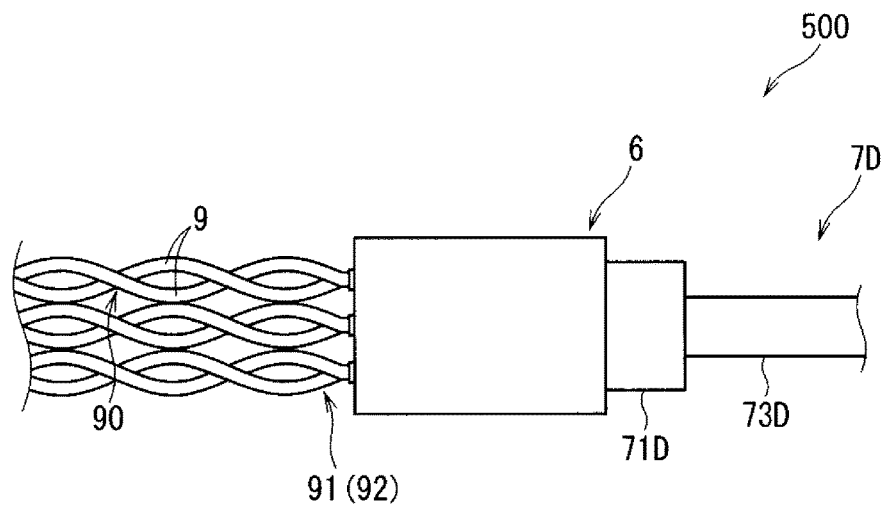
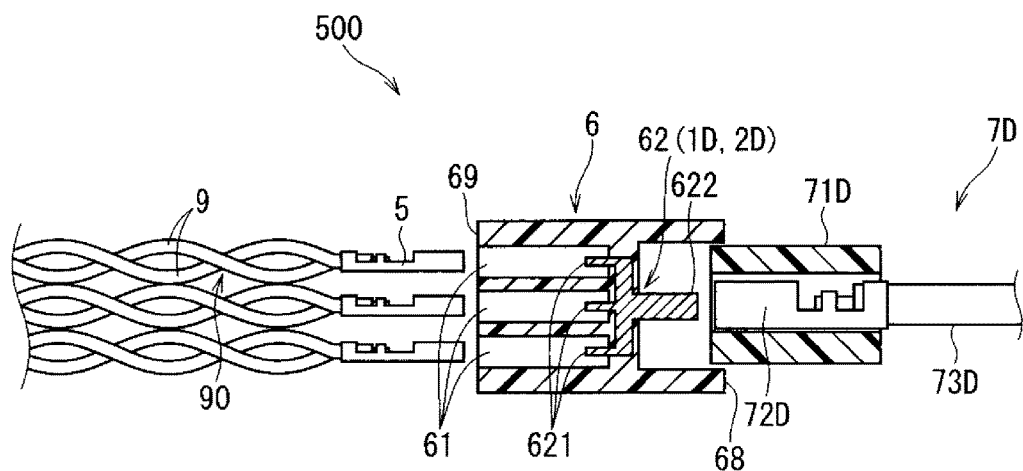
*Figure 9*

WIRE HARNESS WITH CONNECTION MEMBER

CROSS REFERENCE TO RELATED APPLICATIONS

This application claims the priority of Japanese patent application JP2014-234417 filed on Nov. 19, 2014, the entire contents of which are incorporated herein.

TECHNICAL FIELD

The present invention relates to a wire harness including a plurality of electric wires and a connection member connected to these electric wires.

BACKGROUND ART

A wire harness provided in a vehicle such as a car includes a plurality of electric wires and connection members connected to these electric wires.

Also, Patent Document 1 (JP 2006-190495A) discloses an example in which a wire harness includes a knitted electric wire portion in which a plurality of electric wires are knitted together. Note that in the example disclosed in Patent Document 1 (JP 2006-190495A), the plurality of electric wires in the wire harness each constitute an independent circuit.

SUMMARY

Incidentally, if a large electric current flows in one circuit, relatively thick electric wires are adopted as the electric wires that are part of the wire harness. However, there is a concern that thick electric wires are not so flexible and are hard to bend compared to thin electric wires.

An object of the present design improve flexibility of a wire harness that is applicable to a circuit through which a large electric current flows.

A wire harness according to a first aspect includes a plurality of bendable electric wires, a first connection member that is electrically connected to the plurality of electric wires and is a connection target that is provided at a first end of the plurality of electric wires and is shared by the plurality of electric wires, and a second connection member that is electrically connected to the plurality of electric wires and is a connection target that is provided at a second end of the plurality of electric wires and is shared by the plurality of electric wires, in which the plurality of electric wires overall constitute one conductive path between the first connection member and the second connection member. The plurality of electric wires include a plurality of electric wire units that each include at least two or more twisted electric wires, and the plurality of electric wire units are arranged in parallel to each other.

A wire harness according a fifth aspect includes a plurality of bendable electric wires, a first connection member that is electrically connected to the plurality of electric wires and is a connection target that is provided at a first end of the plurality of electric wires and is shared by the plurality of electric wires, and a second connection member that is electrically connected to the plurality of electric wires and is a connection target that is provided at a second end of the plurality of electric wires and is shared by the plurality of electric wires, in which the plurality of electric wires overall constitute one conductive path between the first connection member and the second connection member. The plurality of electric wires each include an undulating portion that is bent in the form of a wave.

A wire harness according to a sixth aspect is one aspect of the wire harness according to the first aspect or the fifth aspect. In the wire harness according to the sixth aspect, at least one of the first connection member and the second connection member is a terminal that is physically connected collectively to the plurality of electric wires.

In the above-described aspects, the plurality of bendable electric wires are connected to the first connection member and the second connection member that are shared by the electric wires. That is, instead of a thick electric wire, use of a plurality of thin electric wires makes it possible to improve flexibility and allow an electric current having the same degree as that in a thick electric wire to flow.

Also, in the first aspect, the plurality of electric wires include the plurality of electric wire units that each include at least two or more twisted electric wires. In this case, in the electric wire unit, it is possible to improve wire harness handling performance.

Also, in the first aspect, the plurality of electric wire units are arranged in parallel to each other. In this case, deformation of each of the plurality of electric wire units does not easily affect deformation of another electric wire unit, and the plurality of electric wire units each easily bend. Thus, the flexibility of a wire harness can be further improved.

Also, in the fifth aspect, the plurality of electric wires each include an undulating portion that is bent in the form of a wave. In this case, the undulating portion easily bends, and the flexibility of a wire harness can be further increased.

Also, in the sixth aspect, at least one of the first connection member and the second connection member is a terminal that is physically connected collectively to the plurality of electric wires, and thus it is possible to easily connect the electric wires to the first connection member or the second connection member, or to the first connection member and the second connection member.

BRIEF DESCRIPTION OF DRAWINGS

FIG. 8 is a side view of a wire harness according to a fifth embodiment.

FIG. 9 is a partially cut-away side view of a part of the wire harness according to the fifth embodiment.

EMBODIMENTS

Hereinafter, embodiments will be described with reference to the accompanying drawings. The embodiments below are merely specific examples of the present invention, and are not to be construed as limiting the technical scope of the present invention.

First Embodiment

A wire harness 100 according to a first embodiment will be described with reference to FIGS. 1, 2, 3, and 4. The wire harness 100 includes a plurality of electric wires 9, a first connection member 1, and a second connection member 2. The wire harness 100 is provided in a vehicle such as a car, for example.

Figure 1:
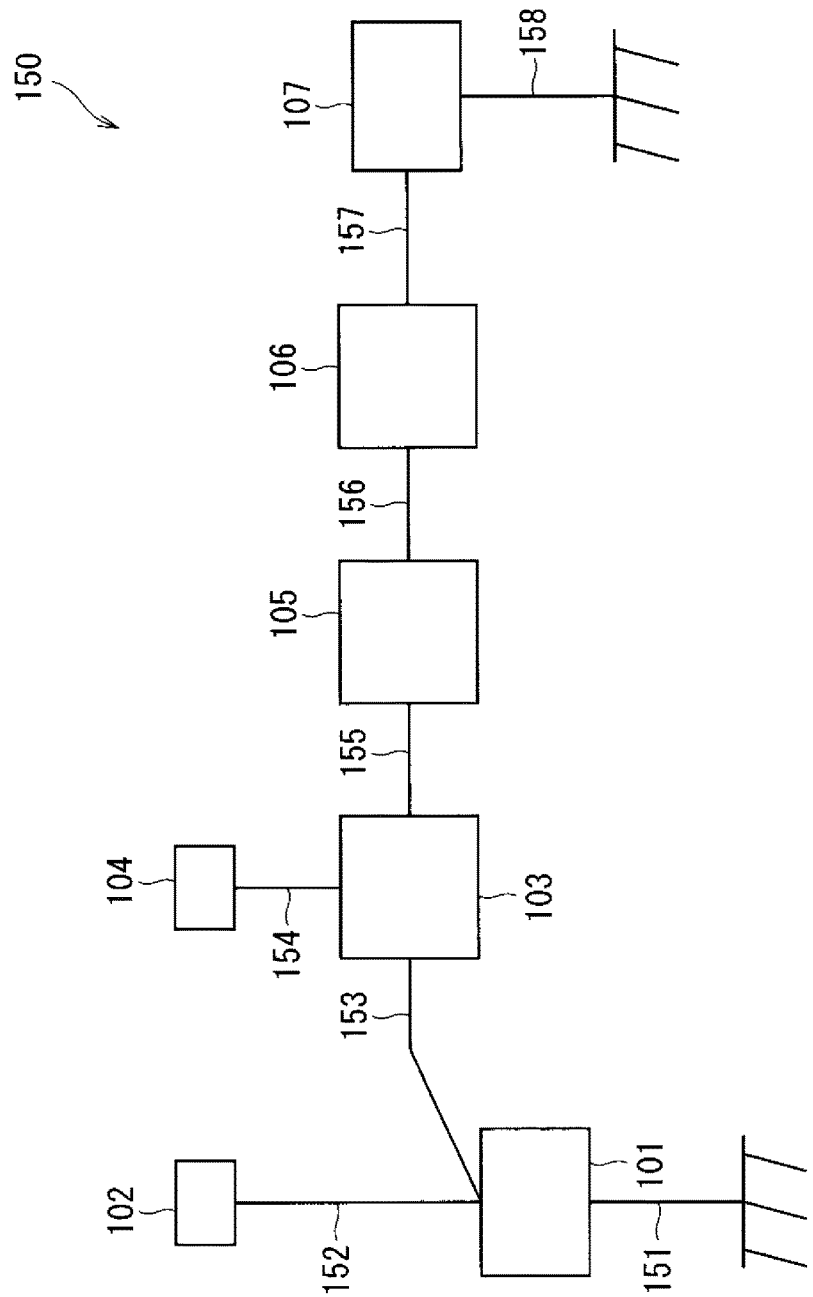
FIG. 1 is a schematic diagram of a circuit to which a wire harness according to a first embodiment is applied.
Figure 2:
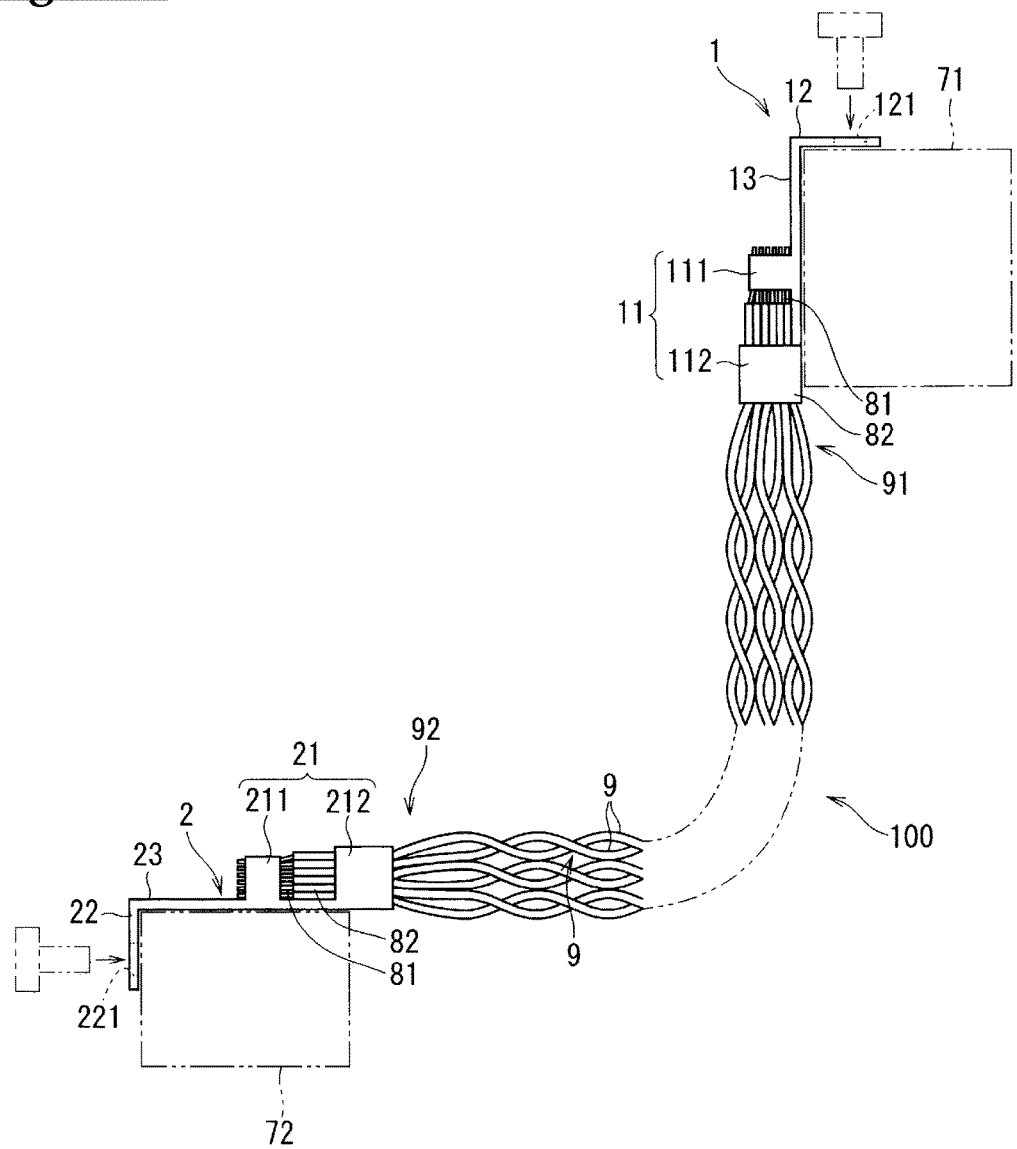
FIG. 2 is a side view of the wire harness according to the first embodiment.
Figure 3:
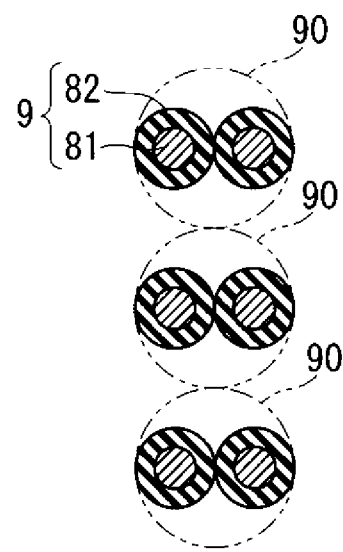
FIG. 3 is a cross-sectional view showing one example in which electric wires of the wire harness according to the first embodiment are arranged.
Figure 4:
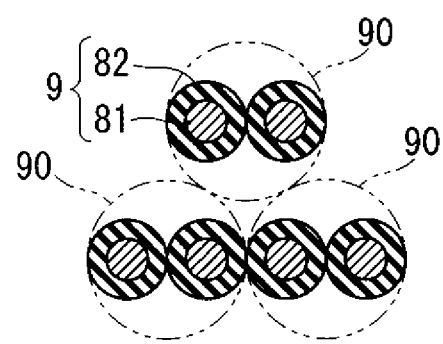
FIG. 4 is a cross-sectional view showing one example in which the electric wires of the wire harness according to the first embodiment are arranged.

FIG. 1 is a schematic diagram showing a location to which the wire harness 100 is applied. FIG. 2 is a side view showing the wire harness 100. Note that the arrangement of electric wires 9 included in the wire harness 100 is simplified in FIG. 2. Also, the bent wire harness 100 is drawn with phantom lines (chain-double dashed lines) in FIG. 2. FIGS. 3 and 4 are cross-sectional views showing examples of how the plurality of electric wires 9 of the wire harness 100 can be arranged.

Wire Harness: Electric Wire

As shown in FIG. 2, the wire harness 100 includes a plurality of bendable electric wires 9. As described in the present embodiment, it is conceivable that the electric wires 9 are insulated electric wires including core wires 81 and insulating coatings 82 that cover the core wires 81, for example. Note that "bendable electric wires 9" refers to soft and relatively thin electric wires in the present embodiment.

Also, the wire harness 100 includes one type of electric wires 9 having the same thickness in the present embodiment. It is also conceivable that the wire harness 100 includes a plurality of types of electric wires 9 having different thicknesses.

It is conceivable that the core wire 81 is a member containing metal such as copper or aluminum as a main component, for example. Also, it is conceivable that the insulating coating 82 is a member made of a synthetic resin containing polyethylene or vinyl chloride as a main component, for example.

Also, in the present embodiment, the plurality of electric wires 9 includes one or more electric wire units 90 including at least two or more twisted electric wires. An example shown in FIGS. 1 to 4 is a case where the wire harness 100 includes three electric wire units 90 each obtained by twisting two electric wires 9. That is, in the example shown in FIGS. 1 to 4, the wire harness 100 includes six electric wires 9.

It is also conceivable that the wire harness includes a plurality of electric wire units each obtained by twisting three or more electric wires 9. Also, it is conceivable that the wire harness includes one electric wire unit obtained by twisting two or more electric wires 9. Also, it is conceivable that the number of electric wires 9 included in the wire harness is not six.

Also, in the present embodiment, the two electric wires 9 included in an electric wire unit 90 are twisted. Such an electric wire unit 90 can be easily produced using an existing stranding machine, for example.

Also, in the present embodiment, the insulating coatings 82 are removed from the ends of the plurality of electric wires 9 and the core wires 81 are exposed at the ends. A first connection member 1 and a second connection member 2, which will be described later, are connected to the core wires 81 extending from the insulating coatings 82 at the ends. In the following description, one of the ends of the electric wires 9 that is provided with the first connection member 1 is referred to as "first end 91", and the other end that is provided with the second connection member 2 is referred to as "second end 92", as appropriate.

Also, in the present embodiment, the two electric wires 9 are untwisted at the ends of the electric wire units 90. That is, in the present embodiment, the electric wires 9 and the first connection member 1 are connected at the first end 91 of the electric wire units 90 in a state in which the two electric wires 9 are untwisted. Similarly, the electric wires 9 and the second connection member 2 are connected at the second end 92 of the electric wire units 90 in a state in which the two electric wires 9 are untwisted.

Also, in the present embodiment, the plurality (three in this example) of electric wire units 90 are arranged in parallel to each other. That is, in the wire harness 100 of the present embodiment, the electric wire units 90 are not knitted. In this case, deformation of one electric wire unit 90 does not easily affect other electric wire units 90, and the overall flexibility of the plurality of electric wire units 90 can be increased.

It is conceivable that, for example, the electric wire units 90 are arranged along a line in parallel to each other, as shown in FIG. 3, or the plurality of electric wire units 90 are arranged in parallel to each other such that the distances between centers of adjacent electric wire units 90 are the shortest as shown in FIG. 4.

In the example shown in FIG. 3, the plurality of electric wire units 90 are arranged along a line in parallel to each other, and thus this wire harness 100 can be easily installed at a location such as a narrow space, for example. Also, in this case, the wire harness 100 can be relatively easily bent in a direction orthogonal to the direction in which the plurality of electric wire units 90 are arranged.

In the example shown in FIG. 4, the plurality of electric wire units 90 are arranged in parallel to each other such that the distances between centers of adjacent electric wire units 90 are shortest, and thus the overall size in a radial direction of the electric wire units 90 can be reduced. In this case, it is possible to reduce the space required by the plurality of electric wires 9 of the wire harness 100.

In the wire harness 100, the first connection member 1 is provided at the first end 91 of the plurality of electric wires 9. The first connection member 1 is a connection target shared by the plurality of electric wires 9. The first connection member 1 is electrically connected to the plurality of electric wires 9.

Also, in the wire harness 100, the second connection member 2 is provided at the second end 92 of the plurality of electric wires 9. The second connection member 2 is a connection target shared by the plurality of electric wires 9. The second connection member 2 is electrically connected to the plurality of electric wires 9.

In the wire harness 100, the plurality of electric wires 9 are connected to the first connection member 1 and the second connection member 2 that are shared by the electric wires 9. That is, in the wire harness 100, the plurality of electric wires 9 overall form one conductive path between the first connection member 1 and the second connection member 2.

Also, in the present embodiment, at least one of the first connection member 1 and the second connection member 2 is a terminal that is physically connected collectively to the plurality of electric wires 9. Note that the present embodiment is an example in which the first connection member 1 and the second connection member 2 are physically connected collectively to a plurality of electric wires 9. Also, in the present embodiment, the wire harness 100 includes a first connection member 1 and a second connection member 2 that have a similar structure. However, the first connection member 1 and the second connection member 2 in the wire harness 100 may also differ in structure.

In the present embodiment, as shown in FIG. 2, the first connection member 1 is a terminal including an electric wire connection portion 11, which is connected to the electric wires 9, a contact portion 12, which is connected to a counterpart member 71, and a middle portion 13 between the electric wire connection portion 11 and the contact portion 12.

The electric wire connection portion 11 is a portion that is physically connected to the plurality of electric wires 9. As shown in FIG. 2, in the present embodiment, the electric wire connection portion 11 is a portion that is collectively crimped to the plurality of electric wires 9. However, it is also conceivable that the electric wire connection portion 11 is collectively welded to the plurality of electric wires 9 through ultrasonic welding, hot welding, or the like.

The electric wire connection portion 11 includes a first crimped portion 111 crimped to the core wires 81 of the plurality of electric wires 9 and a second crimped portion 112 crimped to the insulating coatings 82 of the plurality of electric wires 9. In the present embodiment, the core wires 81 of the plurality of electric wires 9 and the first connection member 1 are electrically and physically connected to each other by crimping the first crimped portion 111, collectively covering the core wires 81 of the plurality of electric wires 9. Also, the state of physical connection between the plurality of electric wires 9 and the first connection member 1 is stabilized by crimping the second crimped portion 112, collectively covering the insulating coatings 82 of the plurality of electric wires 9.

Also, in the present embodiment, at the first end 91 of the plurality of electric wires 9, the two electric wires 9 included in each of the electric wire units 90 are untwisted. Thus, the electric wires 9 are crimped to the first crimped portion 111 and the second crimped portion 112 of the first connection member 1 in the state in which these electric wires 9 are untwisted. In this case, the electrical connection and physical connection between the plurality of electric wires 9 and the first connection member 1 are stabilized.

The contact portion 12 is a portion that is physically connected to the counterpart member 71. The counterpart member 71 is a member that is electrically connected to the plurality of electric wires 9 with the first connection member 1. In the present embodiment, the counterpart member 71 is an electrical device provided in a vehicle. It is conceivable that in the electrical device provided in a vehicle, the counterpart member 71 is a device that requires a relatively large electric current, and examples of the counterpart member 71 include an R/B (relay box), a BAT (battery), and an ST (starter motor).

Also, in the present embodiment, a connection hole 121 for fastening a bolt is formed in the contact portion 12. The connection hole 121 is a through-hole passing through from one principal surface to the other principal surface of the contact portion 12 of the first connection member 1. In the present embodiment, it is conceivable that a counterpart connection hole for fastening a bolt is also formed in the counterpart member 71. Thus, the first connection member 1 and the counterpart member 71 are electrically and physically connected to each other, in a state in which the connection hole 121 at the contact portion 12 of the first connection member 1 and the counterpart connection hole of the counterpart member 71 overlap with each other, by inserting a bolt into the connection hole 121 and the counterpart connection hole and fastening the bolt.

The middle portion 13 is a portion for joining the electric wire connection portion 11 and the contact portion 12 together. In the present embodiment, the middle portion 13 extends from the electric wire connection portion 11 along the longitudinal direction of the electric wires 9. That is, the middle portion 13 and the electric wire connection portion 11 are formed side by side along one straight line. On the other hand, the contact portion 12 extends from a portion of the middle portion 13 that is opposite to the electric wire connection portion 11, along a direction orthogonal to the direction in which the one straight line extends. That is, in the present embodiment, a terminal having a right angle between the contact portion 12 and the middle portion 13 is adopted as the first connection member 1. Note that a terminal obtained by forming the electric wire connection portion 11, the middle portion 13, and the contact portion 12 on one straight line may also be adopted as the first connection member 1.

Also, in the present embodiment, the second connection member 2 has a structure similar to that of the first connection member 1. That is, the second connection member 2 is a terminal including an electric wire connection portion 21 that is a portion connected to the electric wires 9, a contact portion 22 that is a portion connected to a counterpart member 72, and a middle portion 23 between the electric wire connection portion 21 and the contact portion 22. The electric wire connection portion 21 includes a first crimped portion 211 crimped to the core wires 81 at the second end 92 in the plurality of electric wires 9 and a second crimped portion 212 crimped to the insulating coatings 82. A connection hole 221 for fastening a bolt to the counterpart member 72 is formed in the contact portion 22. Similarly to the counterpart member 71, it is conceivable that the counterpart member 72 is a device that requires a relatively large electric current in an electrical device provided in a vehicle. Note that in the present embodiment, the second connection member 2 has a structure similar to that of the first connection member 1, and thus a detailed description of each component is omitted.

The wire harnesses 100 provided with the plurality of electric wires 9, the first connection member 1, and the second connection members 2 is provided in at least a part of one circuit provided in a vehicle. In the wire harness 100, the plurality of bendable electric wires 9 are connected to the first connection member 1 and the second connection member 2 that are shared thereby (i.e. common to them). That is, instead of a thick electric wire, a plurality of thin electric wires 9 are used. That is, in the wire harness 100, it is possible to allow an electric current having a similar degree to that in a thick electric wire to flow using a plurality of relatively thin electric wires 9. Thus, the thin electric wires 9 can be easily bent compared to a thick electric wire. Therefore, the flexibility of the wire harness 100 can be increased.

Also, if a circuit is constituted by a thick electric wire, there is a concern that the manufacturing costs will increase by having to use an excessively large wire since there is only a limited number of wires of different sizes. On the other hand, in the present embodiment, the wire harness 100 can also be produced using the minimum number of electric wires 9 by selecting the number of electric wires 9 in accordance with an electric current required by the circuit. In this case, the manufacturing cost can be kept low. It is conceivable that the wire harness 100 includes more electric wires 9 than the minimum number of electric wires 9 that are required by a circuit to which the wire harness 100 is applied.

Also, in the wire harness 100, a plurality (three in this example) of electric wire units 90 are arranged in parallel to each other. Thus, the electric wire units 90 can each deform independently. That is, the plurality of electric wire units 90 are not linked to adjacent electric wire units 90 in a section between the first connection member 1 and the second connection member 2. Thus, the plurality of electric wire units 90 can deform such that the electric wire units 90 pass by one another, an interval between adjacent electric wire units 90 increases, or an interval between adjacent electric wire units 90 decreases, for example. Thus, the flexibility of the electric wire units 90 does not deteriorate, and the flexibility of the wire harness 100 further increases.

Also, in the wire harness 100, the plurality of electric wires 9 include one or more electric wire units 90 (three in this example) each including at least two or more (two in this example) twisted electric wires 9. In this case, it is possible to inhibit the plurality of electric wires 9 from untwisting, and for example, the operation for installing the wire harness 100 in a vehicle and the handling performance when the wire harness 100 is transferred are improved.

Also, in the wire harness 100, the plurality of electric wire units 90 (three in this example) are arranged in parallel to each other, and thus deformation of each of the three electric wire units 90 does not easily affect deformation of the other electric wire units 90, and the plurality of electric wire units 90 each easily bend.

Also, in the wire harness 100, at least one (both in this example) of the first connection member 1 and the second connection member 2 is a terminal that is physically connected collectively to the plurality of electric wires 9 (six in this example), and thus it is possible to easily perform the operation for connecting the electric wires 9 to the first connection member 1 and the second connection member 2.

Also, the section (conductive path formed by the plurality of electric wires 9) for linking the first connection member 1 and the second connection member 2 is flexibly bendable, and thus in the wire harness 100, it is possible to inhibit a large stress from being applied to the portion at which the first connection member 1 and the plurality of electric wires 9 are connected and the portion at which the second connection member 2 and the plurality of electric wires 9 are connected.

Also, the wire harness 100 is applicable to a circuit as shown in FIG. 1, for example. Hereinafter, an application example of the wire harness 100 will be described with reference to one example of a circuit provided in a vehicle shown in FIG. 1.

FIG. 1 shows a circuit 150 including a grounded BAT 101, an ST 102, an R/B 103, an ALT 104 (alternator), an FB 105 (fuse block), a DCDC 106 (DC-DC converter), and a grounded sub-BAT 107. In the circuit 150, the components are linked with conductive paths 151 to 158. That is, the circuit 150 includes the conductive path 151 for linking a grounding point and the BAT 101, the conductive path 152 for linking the BAT 101 and the ST 102, the conductive path 153 for linking the BAT 101 and the R/B 103, the conductive path 154 for linking the R/B 103 and the ALT 104, the conductive path 155 for linking the R/B 103 and the FB 105, the conductive path 156 for linking the FB 103 and the DCDC 106, the conductive path 157 for linking the DCDC 106 and the sub-BAT 107, and the conductive path 158 for linking the grounding point and the sub-BAT 107.

The circuit shown in FIG. 1 is a circuit for linking the BAT 101 and the sub-BAT 107, and is not protected by a fuse. Thus, it is conceivable that in FIG. 1, for example, one end is linked to the BAT 101 or the sub-BAT 107, and the wire harness 100 is adopted for the conductive paths 151 to 153, 157, and 158 through which a relatively large electric current is likely to flow. In this case, the degree of freedom of the conductive paths 151 to 153, 157, and 158 increases due to adoption of the wire harness 100, instead of a thick electric wire.

Note that in FIG. 1, one electric wire is adopted for the other conductive paths 154 to 156. However, the wire harness 100 may also be adopted for the conductive paths 154 to 156.

Also, the manufacturing cost can be kept low by adopting a wire harness 100 including an optimal number of electric wires 9 in accordance with the electric current that flows through the conductive paths 151 to 153, 157, and 158. In particular, when the wire harness 100 includes one type of electric wire 9 and a wire harness 100 that includes an appropriate number of electric wires 9 for the conductive paths 151 to 153, 157, and 158 is produced by changing the number of one type of electric wires 9, the manufacturing cost can be further reduced.

Second Embodiment

Figure 5:
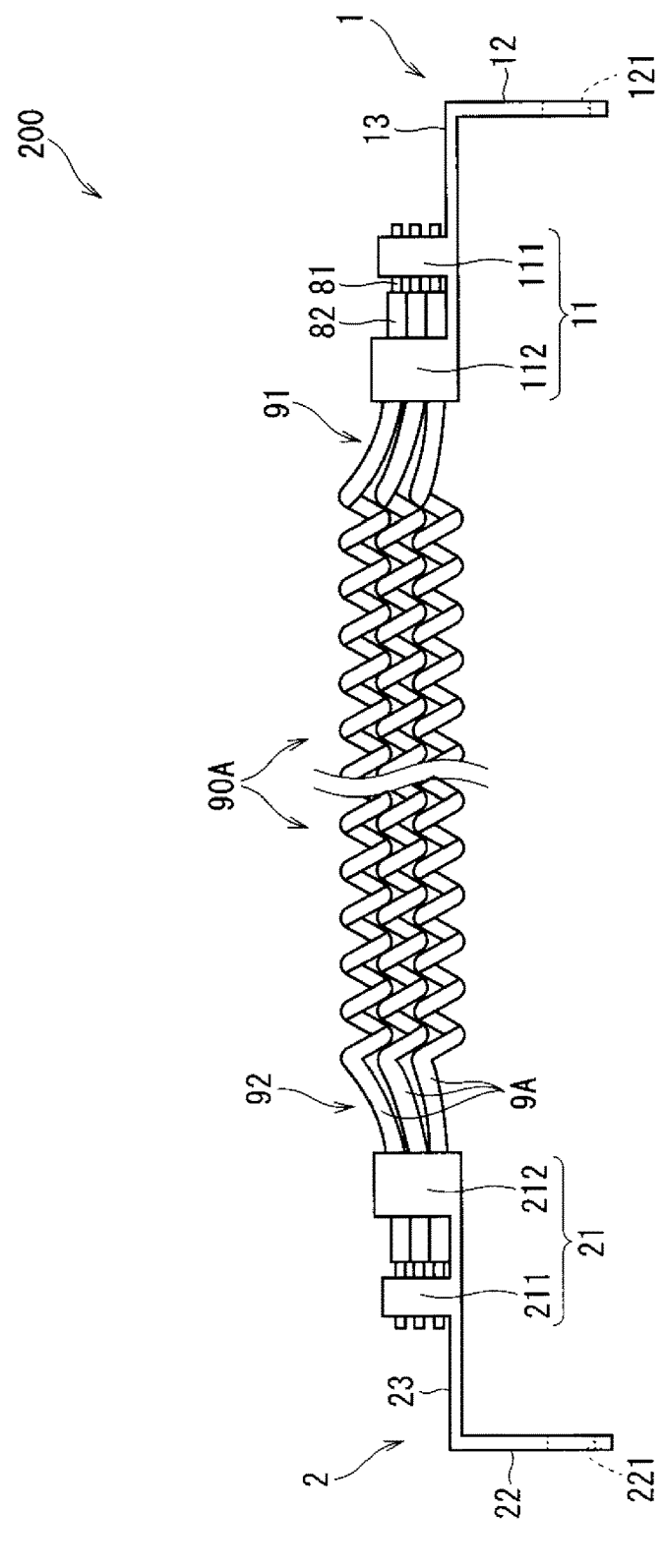
FIG. 5 is a side view of a wire harness according to a second embodiment.

Next, a wire harness 200 according to a second embodiment will be described with reference to FIG. 5. The wire harness 200 includes a plurality of electric wires 9A, instead of a plurality of electric wires 9 for linking the first connection member 1 and the second connection member 2. FIG. 5 is a side view of the wire harness 200. Note that constituent elements that are the same as the constituent elements shown in FIGS. 1 to 4 will be assigned the same reference signs in FIG. 5. Hereinafter, a difference between the present embodiment and the first embodiment will be described.

In the wire harness 200, the plurality of electric wires 9A each include a helical portion 90A that is wound helically. Note that as shown in FIG. 5, the present embodiment is an example in which the wire harness 200 includes three electric wires 9A. Also, the arrangement of the electric wires 9A included in the wire harness 200 is simplified in FIG. 5.

Similarly to the first embodiment, the plurality of electric wires 9A are preferably arranged in parallel to each other in the present embodiment as well. This is because the electric wires 9A easily deform and the flexibility of the wire harness 200 increases. Note that the electric wires 9A are arranged such that as described above, the electric wires 9A are arranged along a line or the distances between centers of adjacent electric wires 9A are the shortest.

In the present embodiment, the electric wires 9A each keeps a form having a helical portion 90A that is helically wound in its natural state. Note that "electric wire 9A in its natural state" means an electric wire 9A to which no external force is applied.

Also, in the present embodiment, the helical portions 90A of the three electric wires 9A each have the same helical pitch. However, it is also conceivable that the helical portions of the plurality of electric wires 9A include different helical pitches or all differ in helical pitch.

Also, in the present embodiment, the helical portions 90A that are wound helically are not formed at the first end 91 and the second end 92 of the electric wires 9A. That is, the first connection member 1 and the second connection member 2 are crimped at the first end 91 and the second end 92 of the electric wires 9A, covering the three electric wires 9A that each extend linearly. In this case, the connections of the electric wires 9A to the first connection member 1 and the second connection member 2 are stabilized. Such electric wires 9A can be obtained by untwisting the helical windings at the first end 91 and the second end 92 from electric wires 9A that each have the helical portion 90A along their full length, and extending the untwisted portion, for example. Also, it is conceivable that the wire harness 200 is produced using electric wires 9A that are not provided with helical portions 90A at the first end 91 and the second end 92 in the first place.

In the wire harness 200, if the plurality of electric wires 9A are arranged in a curved path, a path difference between the electric wire 9A arranged on the outer side of the curved path and the electric wire 9A arranged on the inner side of the curved path is absorbed by the helical portions 90A of the electric wires 9A shrinking or stretching. More specifically, for example, the helical portion 90A of the electric wire 9A arranged on a relatively outer side of the curved path is stretched, and the helical portion 90A of the electric wire 9A arranged on a relatively inner side of the curved path is shrunk, and thereby, a path difference between the outer side and the inner side of the curved path is absorbed. Thus, in the present embodiment, the plurality of electric wires 9A can be easily collectively bent in a certain direction, and the flexibility of the wire harness 200 increases.

Third Embodiment

Figure 6:
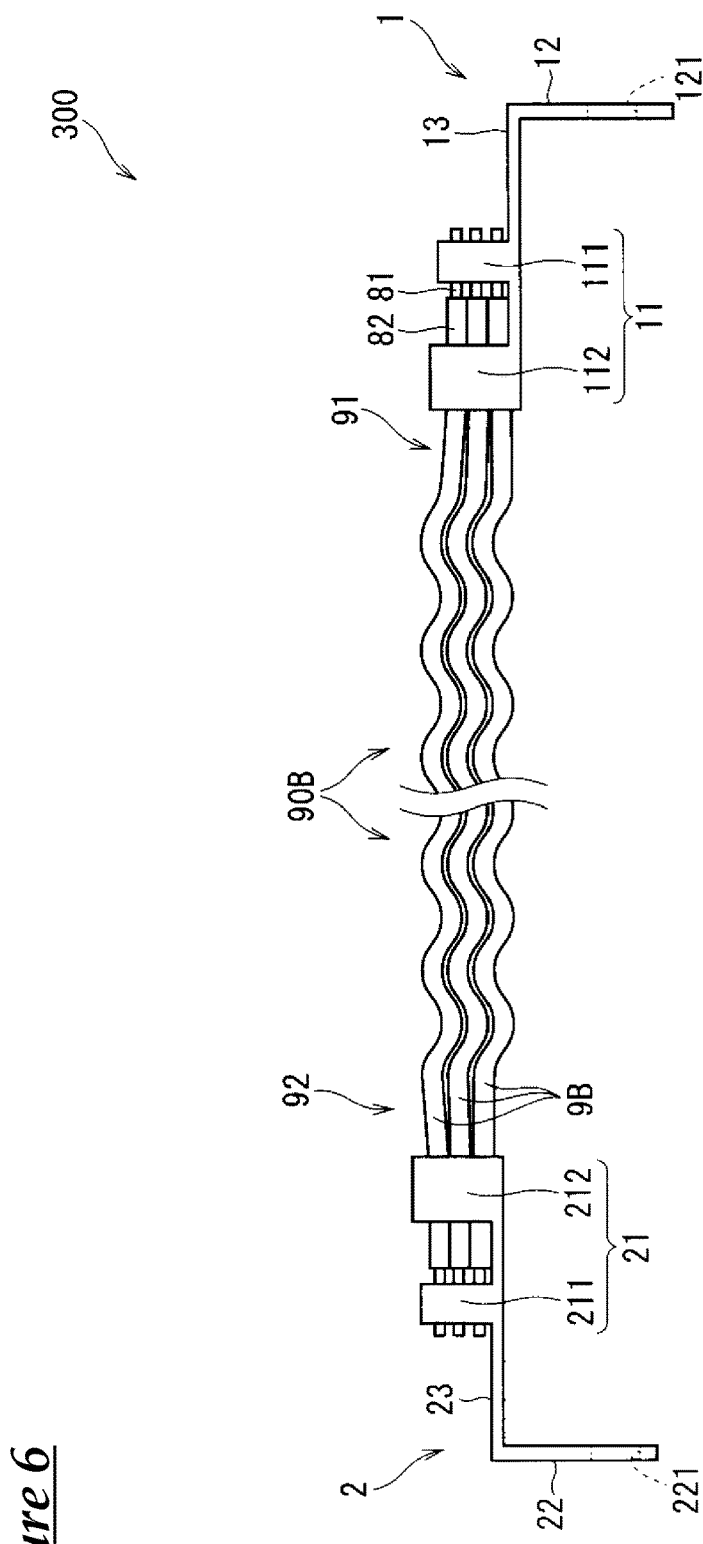
FIG. 6 is a side view of a wire harness according to a third embodiment.

Next, a wire harness 300 according to a third embodiment will be described with reference to FIG. 6. The wire harness 300 includes a plurality of electric wires 9B, instead of the plurality of electric wires 9 and 9A. FIG. 6 is a side view of the wire harness 300. Note that constituent elements that are the same as the constituent elements shown in FIGS. 1 to 5 will be assigned the same reference signs in FIG. 6. Hereinafter, a difference between the present embodiment and the first embodiment or the second embodiment will be described.

In the wire harness 300, the plurality of electric wires 9B each include an undulating portion 90B that is bent in the form of a wave. Note that as shown in FIG. 6, the present embodiment is an example in which the wire harness 300 includes three electric wires 9B. Also, the arrangement of the electric wires 9B included in the wire harness 300 is simplified in FIG. 6.

Similarly to the first embodiment, the plurality of electric wires 9B are preferably arranged in parallel to each other in the present embodiment as well. This is because the electric wires 9B easily deform and the flexibility of the wire harness 300 increases. Note that the electric wires 9B are arranged such that as described above, the electric wires 9B are arranged along a line or the distances between centers of adjacent electric wires 9B are the shortest.

In the present embodiment, the electric wires 9B each keep a form having an undulating portion 90B in which the electric wire is bent in the form of a wave in its natural state. Note that "electric wire 9B in its natural state" means an electric wire 9B to which no external force is applied.

In the present embodiment, the undulating portions 90B of the plurality of electric wires 9B each include bent portions that each alternately protrude in opposite directions and extend along the longitudinal direction of the electric wires 9B. Also, in the present embodiment, the three electric wires 9B have the same shape in its natural state. It is also conceivable that the electric wires 9B included in the wire harness 300 include different shapes or all differ in shape.

Also, in the present embodiment, no undulating portions 90B that are each bent in the form of a wave are formed at the first end 91 and the second end 92 of the electric wires 9B. In this case, as described in the second embodiment, the connections of the electric wires 9B to the first connection member 1 and the second connection member 2 are stabilized.

In the wire harness 300, in a state in which the plurality of electric wires 9B are each arranged in a curved path, a path difference between the electric wire 9B arranged on the outer side of the curved path and an electric wire 9B arranged on the inner side of the curved path is absorbed by the helical portions 90B of the electric wires 9B shrinking or stretching. More specifically, for example, the undulating portion 90B of the electric wire 9B arranged on a relatively outer side of the curved path is stretched, and the undulating portion 90B of the electric wire 9B arranged on a relatively inner side of the curved path is shrunk, and thereby, a path difference between the outer side and the inner side of the curved path is absorbed. Thus, in the present embodiment, the plurality of electric wires 9B can be easily collectively bent in a certain direction, and the flexibility of the wire harness 300 increases.

Fourth Embodiment

Figure 7:
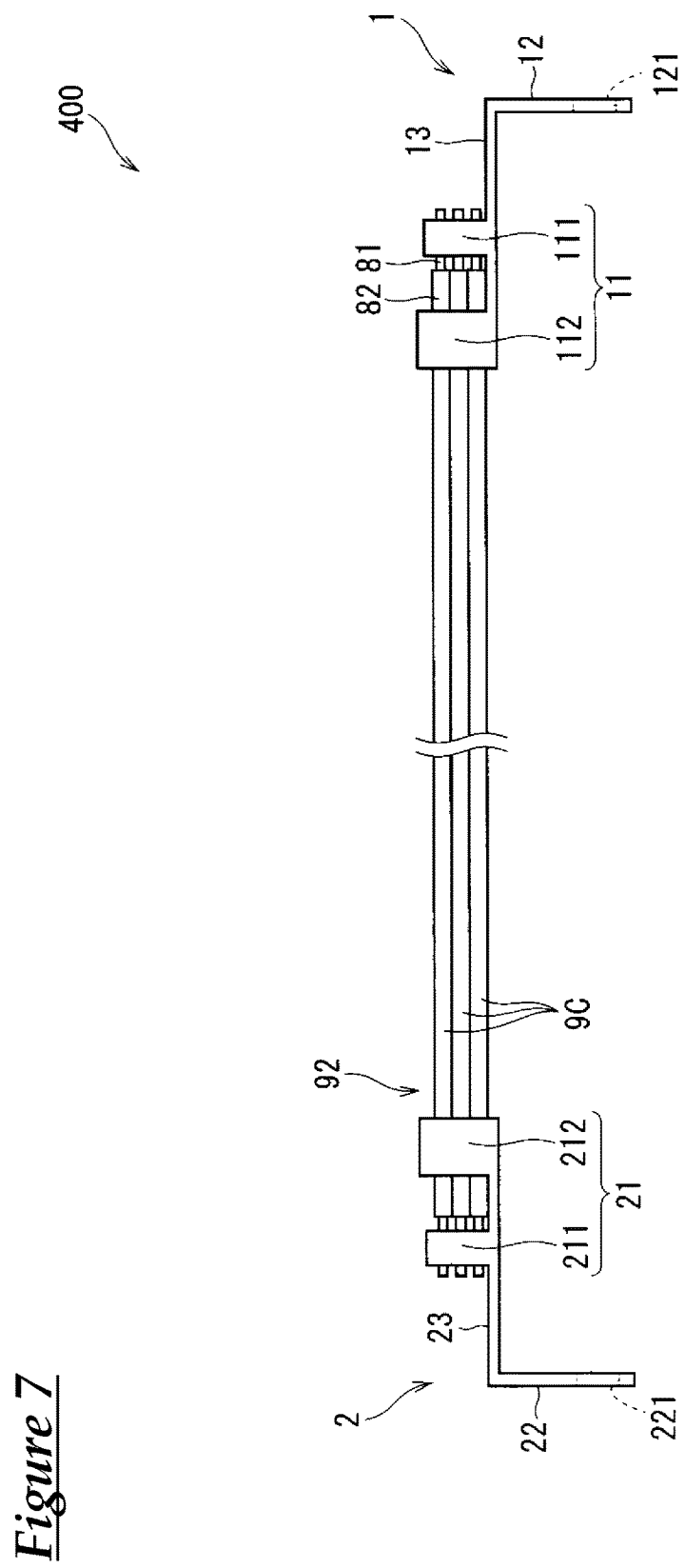
FIG. 7 is a side view of a wire harness according to a fourth embodiment.

Next, a wire harness 400 according to a fourth embodiment will be described with reference to FIG. 7. The wire harness 400 includes a plurality of electric wires 9C, instead of the plurality of electric wires 9, 9A, and 9B. FIG. 7 is a side view of the wire harness 400. Note that constituent elements that are the same as the constituent elements shown in FIGS. 1 to 6 will be assigned the same reference signs in FIG. 7. Hereinafter, a difference between the present embodiment and the first embodiment, the second embodiment, or the third embodiment will be described.

In the wire harness 400, the plurality of electric wires 9C are electric wires that maintain their linear shape in their natural state. Note that the arrangement of the electric wires 9C included in the wire harness 400 is simplified in FIG. 7.

In the present embodiment, the plurality of electric wires 9C are bundled together at the first end 91 and the second end 92, but in a middle portion between the first end 91 and the second end 92, they are separate. That is, the plurality of electric wires 9C are not linked to adjacent electric wires 9C in a section between the first connection member 1 and the second connection member 2. Thus, the plurality of electric wires 9C can deform such that the electric wires 9C pass by one another, an interval between adjacent electric wires 9C increases, or an interval between adjacent electric wires 9C decreases, for example. Accordingly, in the present embodiment, the flexibility of the plurality of electric wires 9C can be kept.

That is, in the present embodiment, the plurality of electric wires 9C can deform such that the interval between the electric wires 9C increases or decreases in the middle portion. Accordingly, the flexibility of the electric wires 9C does not deteriorate and the flexibility of the wire harness 400 increases in the present embodiment as well.

Fifth Embodiment

Next, a wire harness 500 according to a fifth embodiment will be described with reference to FIGS. 8 and 9. The wire harness 500 includes a first connection member 1D and a second connection member 2D that each have a structure different from that of the first embodiment, instead of the first connection member 1 and the second connection member 2. FIG. 8 is a side view of the wire harness 500. FIG. 9 is an exploded side view of a part of the wire harness 500. Also, FIG. 9 is a partially cut-away side view of a part of the wire harness 500. Note that constituent elements that are the same as the constituent elements shown in FIGS. 1 to 7 will be assigned the same reference signs in FIGS. 8 and 9. Hereinafter, differences between the present embodiment and the first embodiment, the second embodiment, the third embodiment, or the fourth embodiment will be described.

Note that in the present embodiment, the first end 91 of the plurality of electric wires 9 as shown in FIGS. 8 and 9 will be described. In the present embodiment, similarly to the first embodiment, the case where the first connection member 1D and the second connection member 2D have the same structure will be described. Thus, the description of the structure of the first end 91 below is also valid as the description of the second end 92. That is, the first end 91 shown in FIGS. 8 and 9 may also be the second end 92. Also, the first connection member 1D shown in FIGS. 8 and 9 may also be the second connection member 2D.

In the wire harness 500, the first end 91 of the plurality of electric wires 9 is provided with a connector 6. The connector 6 includes cavities 61 that can accommodate the electric wires 9 and a bus bar 62 that is electrically connected to the plurality of electric wires 9.

In the present embodiment, similarly to the first embodiment, the wire harness 500 includes three electric wire units 90 obtained by twisting two electric wires 9. The two electric wires 9 are crimped to a shared terminal (hereinafter, relay terminal 5) at the first end 91 of the electric wire units 90. That is, in the present embodiment, ends of the three electric wire units 90 are provided with three relay terminals 5.

In the present embodiment, the connector 6 includes three cavities 61 that can accommodate three relay terminals 5 provided at the three electric wire units 90. The cavities 61 of the connector 6 each have an opening on a first surface 69 of the connector 6. Note that the first surface 69 of the connector 6 is a surface located on the side of the plurality of electric wires 9. In the present embodiment, the relay terminals 5 connected to the plurality of electric wires 9 are brought close to the first surface 69 and are accommodated in the cavities 61.

The bus bar 62 is provided inside the cavity 61. In the present embodiment, the bus bar 62 is provided at the innermost portion (the innermost position from the first surface 69) of the cavities 61.

In the present embodiment, the bus bar 62 provided at the innermost portion of the cavities 61 includes three first connection portions 621 that protrude toward the first surface 69 of the connector 6. The relay terminals 5 that are respectively provided in the electric wire units 90 are connected to the three first connection portions 621. In the present embodiment, the first connection portions 621 are formed into a bar shape. In this case, the bus bar 62 and the relay terminals 5 are electrically and physically connected by the first connection portions 621 and holes formed at the tips of the relay terminals 5 being fitted to each other.

Also, in the present embodiment, the bus bar 62 includes a single second connection portion 622 that protrudes toward a surface (a second surface 68) opposite to the first surface 69 of the connector 6. A counterpart member 7D is connected to this single second connection portion 622.

Note that a counterpart cavity 67 surrounding the second connection portion 622 is formed in the second surface 68 of the connector 6.

In the present embodiment, the counterpart member 7D that is a counterpart for connection to the wire harness 500 is a connector. As shown in FIGS. 8 and 9, the counterpart member 7D is a connector-equipped electric wire including a connector 71D, a terminal 72D, and an insulated electric wire 73D. It is also conceivable that the counterpart member 7D is a device connector or the like.

Also, in the present embodiment, as shown in FIGS. 8 and 9, an electric wire that is relatively thick compared to the electric wire 9 included in the wire harness 100 is adopted for the insulated electric wire 73D of the counterpart member 7D. In such an example shown in FIGS. 8 and 9, for example, it is conceivable that a part of the wire harness 500 to the left of the connector 6 is installed in a curved path, and a part of the counterpart member 7D to the right of the connector 6 is installed in a linear path.

In the present embodiment, for example, the counterpart member 7D may be brought closer to the second surface 68 of the connector 6, and accommodated in the counterpart cavity 67. Thus, the bus bar 62 and the counterpart member 7D are electrically and physically connected by a hole formed at the tip of the terminal 72D of the counterpart member 7D and the second connection portion 622 being fitted to each other.

As described above, in the present embodiment, the connection target shared by the plurality of electric wires 9 is the bus bar 62 of the connector 6. That is, in the present embodiment, the first connection member 1D is the bus bar 62 of the connector 6. As shown in FIGS. 8 and 9, the wire harness 500 is electrically connected to the counterpart member 7D via the connector 6. Also, in the present embodiment, the wire harness 500 has excellent flexibility. Thus, the degree of freedom of a path in which a circuit provided in a vehicle is installed increases due to the wire harness 500 being applied to at least a part of the circuit.

APPLICATION EXAMPLE

In the first embodiment to the fifth embodiment, it is conceivable that a plurality of electric wires 9, 9A, 9B, and 9C are bundled by partially winding tape around the plurality of electric wires 9, 9A, 9B, and 9C.

Note that the wire harness according to the present invention can also be configured not only by freely combining the embodiments and application examples that have been described above but also by modifying the embodiments and application examples, or omitting parts thereof, as appropriate without departing from the scope of the invention as defined in the claims.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

1 First connection member
100 Wire harness
2 Second connection member
9 Electric wire
90 Electric wire unit
90A Helical portion
90B Undulating portion
91 First end
92 Second end

The invention claimed is:
1. A wire harness comprising:
a plurality of bendable electric wires;
a first connection member that is electrically connected to the plurality of electric wires and is a connection target that is provided at a first end of the plurality of electric wires and is shared by the plurality of electric wires; and
a second connection member that is electrically connected to the plurality of electric wires and is another connection target that is provided at a second end of the plurality of electric wires and is shared by the plurality of electric wires;
wherein the plurality of electric wires overall constitute one conductive path between the first connection member and the second connection member;
the plurality of electric wires include a plurality of electric wire units that each include at least two or more twisted electric wires; and
the plurality of electric wire units are arranged in parallel to each other.
2. A wire harness comprising:
a plurality of bendable electric wires;
a first connection member that is electrically connected to the plurality of electric wires and is a connection target that is provided at a first end of the plurality of electric wires and is shared by the plurality of electric wires; and
a second connection member that is electrically connected to the plurality of electric wires and is another connection target that is provided at a second end of the plurality of electric wires and is shared by the plurality of electric wires;
wherein the plurality of electric wires overall constitute one conductive path between the first connection member and the second connection member; and
the plurality of electric wires each include an undulating portion that is bent in the form of a wave.
3. The wire harness according to claim 1, wherein at least one of the first connection member and the second connection member is a terminal that is physically connected collectively to the plurality of electric wires.

* * * * *